United States Patent [19]

Walker

[11] Patent Number: 5,482,199

[45] Date of Patent: Jan. 9, 1996

[54] ELECTRIC SOLDERING IRON HAVING SOLDER HOLDING MEANS

[76] Inventor: Leroy Walker, 4719 Rhodes Dr., New Orleans, La. 70126

[21] Appl. No.: 155,284

[22] Filed: Nov. 22, 1993

[51] Int. Cl.⁶ .................................................. B23K 3/06
[52] U.S. Cl. ............................................................. 228/52
[58] Field of Search ........................................ 228/52, 53

[56] References Cited

U.S. PATENT DOCUMENTS

| | | | |
|---|---|---|---|
| 1,631,063 | 5/1927 | Rognley | 228/52 |
| 2,382,390 | 8/1945 | Bergman | 228/52 |
| 2,432,428 | 12/1947 | Lang | 228/52 |
| 2,790,058 | 4/1957 | Verrier | 228/53 |
| 3,146,747 | 9/1964 | Stebbing, Jr. | 228/53 |
| 3,219,251 | 11/1965 | Davis | 228/53 |
| 4,206,864 | 6/1980 | Rauchwerger | 228/53 |
| 4,247,137 | 1/1981 | St. Clair | 228/52 |
| 4,793,541 | 12/1988 | Dravnieks | 228/52 |

FOREIGN PATENT DOCUMENTS

| | | | |
|---|---|---|---|
| 3612341A1 | 10/1987 | Germany | 228/52 |
| 463162 | 3/1937 | United Kingdom | 228/52 |

*Primary Examiner*—P. Austin Bradley
*Assistant Examiner*—Chuck Y. Mah

[57] ABSTRACT

A one handed soldering tool incorporating a heated tip configured with one or more solder retaining recesses therein. Adjacent this heated tip is an end region of a solder supply conduit through which a solid wire solder passes. During operation, as the heated tip is heated, the adjacent end region of the solder supply conduit is likewise heated. Such heating will melt the wire solder therein thereby causing it to flow out of the conduit and into the recesses in the heated tip. This collection of melted solder can then be used to attach a workpiece in place as desired. Consequently, the user is able to support this workpiece during such operation since the step of continuously biasing the solid solder against the heated tip has been eliminated due to the collection of the solder stored in the solder retaining recesses of the heated tip.

12 Claims, 1 Drawing Sheet

ELECTRIC SOLDERING IRON HAVING SOLDER HOLDING MEANS

BACKGROUND OF THE INVENTION

1. Field of the Invention

This invention pertains to soldering tools in general and more particularly to a new configuration for such a tool incorporating a means of feeding the wire solder to the heated tip of the tool and dispensing melted solder therefrom.

2. General Background

Soldering tools come in a variety of shapes and sizes from small hand-held "pencil" types to larger "gun" types and beyond. With each of these devices, generally, the heated soldering tool is held in one hand while the wire solder is held against the heated tip of the tool by the other hand. Consequently, both hands are required to operate the tool leaving no hands free for aligning or supporting the item to be soldered. Thus, it is likely that the end result will be a poor solder joint.

U.S. Pat. No. 4,507,545 issued to Riordan is an effort to address this deficiency. It discloses a pencil type soldering iron that incorporates external hollow tube 50 which directs wire solder 44 to heated tip 18. This wire solder is urged forward by the rotation of wheel 72. Unfortunately, this configuration still requires two hands for operation, one to hold the soldering tool and the other to rotate wheel 72. Additionally, external hollow tube 50 can be inadvertently crimped or bent such that solder 44 is no longer able to pass therethrough. Alternatively, hollow tube 50 can be moved or pushed out of alignment with respect to tip 18 thereby rendering the tool useless.

U.S. Pat. No. 3,796,856 issued to Wei-Cheng discloses a gun type soldering iron in which the wire solder initially extends through the gun handle before passing through an exterior tube on its journey to the heated tip. Again, this external tube is subject to being crimped or bent beyond use thereby also rendering it useless. Additionally, while the wire solder is guided within the handle of the soldering iron, there is no continuous channel therein which would prevent any undesirable misalignment from occurring.

U.S. Pat. No. 5,019,688 issued to Cheng also discloses a pencil-type soldering tool with an external wire solder feed line similar to that described above. Again, should this feed line become bent or crimped, due to being exposed, its function will be lost. Additionally, melted solder is only dispensed when the wire solder is urged against the heated tip, thus, concentration upon this step must take place while also attempting to secure the to-be-soldered part in place.

It is thus an object of this invention to provide a means of one-handed operation of the soldering tool. Another object of this invention is to provide a soldering tool that can supply melted solder on demand without requiring a second hand to bring the wire solder in close proximity to the heated tip. A further object of the present invention is to provide a newly designed soldering tip which can catch and store liquid or melted solder until needed. Yet another object of this invention is to provide a means of dispensing melted solder without also requiring the need to constantly urge solid wire solder against the heated tip of the soldering iron. These and other objects and advantages will become obvious upon further investigation.

SUMMARY OF THE PRESENT INVENTION

The preferred embodiment of the apparatus of the present invention solves the aforementioned problems in a straightforward and simple manner. What is disclosed is a soldering tool that incorporates an elongated housing configured to be engaged by the hand of a user. Within this housing is an elongated conduit that is sized to accept and pass a length of solid wire solder therethrough. Additionally, one end region of this conduit has an opening therein. Guide means for supporting and guiding this solder along the conduit are also located within the housing as well as biasing means that bias or move the solder through the conduit and out the opening. Heated tip means are secured within the housing for heating this one end region of the conduit and for heating the solder therein. These heated tip means are configured with solder retaining recesses therein whereby melted solder flowing out of the opening can be collected and stored in these recesses during operation.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
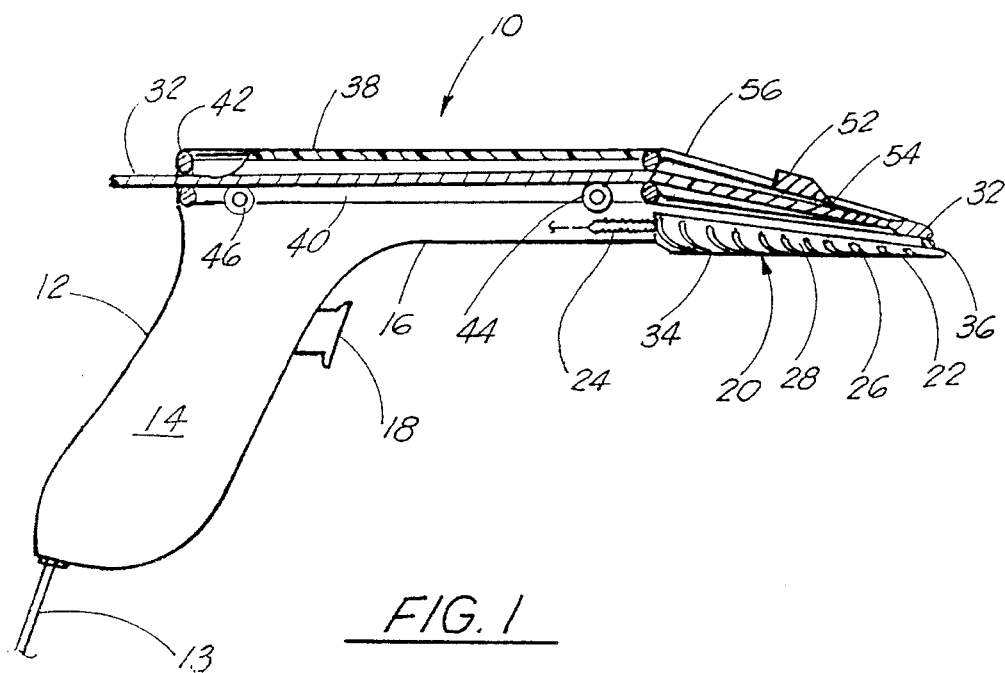
FIG. 1 is a side pictorial view, partially cut away, of the newly configured soldering tool.

Referring initially to FIG. 1, there is shown electric soldering iron tool 10 which is configured in the shape of gun 12, however, other configurations are also likely for tool 10.

In this embodiment, soldering iron 10 incorporates palm grip 14 with extension 16. Finger trigger 18, placed as shown, is connected to cord 13 and used to operate tool 10 between its on and off conditions. Generally, finger trigger 18 will act to interrupt the flow of electricity from a source (not shown) to tool 10 in the normal fashion.

Within extension 16 is heater assembly 20 that incorporates electrically heated tip 22. As shown, tip 22 is coupled to a source of electricity via wires 24 also secured to finger trigger 18 thereby enabling tip 22 to become heated upon operation of finger trigger 18. Tip 22, in this embodiment, is configured with a series of spaced raised baffles 26 and recessed notches 28. In other configurations, there may just be spaced raised baffles 26 or just spaced recessed notches 28. In any event, tip 22 is configured with a series of recesses 28 for the collection and storage of melted or liquid solder 32 therein. Due to tip 22 being heated, such solder 32 can be maintained in its liquid state for as long as desired, or until needed.

Figure 2:
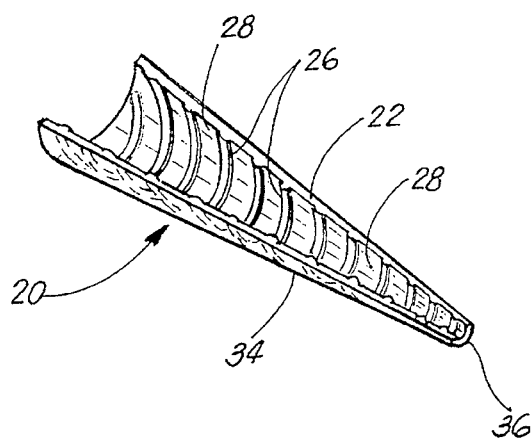
FIG. 2 is an enlarged view, partially cut away, of a portion of the newly configured soldering tip; and, FIG. 3 is an enlarged pictorial view, partially cut away, of the operation of the newly configured soldering tip.
Figure 3:
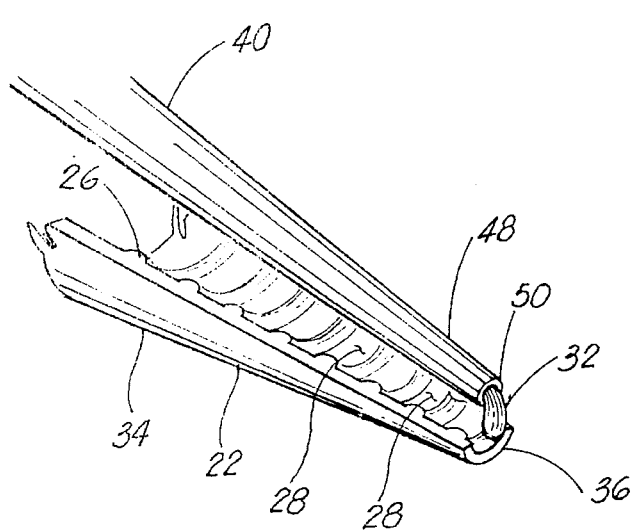

As shown in FIGS. 2 and 3, heated tip 22 is generally shaped as a half-cone 34 tapering to truncated end 36 as shown. This half-cone 34 incorporates baffles 26 and/or notches 28 therein extending generally transverse to the elongation or main axis of cone 34 and from one side to the other. Half-cone 34 can extend along extension 16 as shown for any length as desired. Additionally, heated tip 22 can be a combination of a cone-shape and a cylindrical shape, or any other shape as desired, the important feature being the solder retaining recesses 28 which form a part of heated tip 22. Other configurations of heated tip 22 are also likely.

Extending along an upper region 38 of tool 10 is solder conduit 40. Conduit 40 is sized so as to permit wire solder 32 to freely pass therethrough. Additionally, conduit 40 is continuous so as to constantly provide support to wire solder 32 and to prevent it from buckling while within conduit 40. A series of guides 42 aid in the passage of solder 32 through conduit 40. These guides 42 generally consist of separate roller pairs 44 located along extension 16 which further support solder 32 within conduit 40. A separate wheel or biasing member 46 can also be incorporated to move solder 32 along extension 16 and conduit 40 as desired.

End region 48 of conduit 40 in this embodiment is also tapered like a cone and incorporating a small exit opening 50. This tapered end region 48 terminates immediately adjacent tip 22 either just behind, just in front of, or flush with truncated end 36 of tip 22 as desired. It is through opening 50 of tapered end region 48 that solder 32 will pass before being secured to a workpiece (not shown). Consequently, as tip 22 is heated, such heat will cause solder 32 in end region 48 to melt and flow out opening 50 onto the workpiece. Alternately, solid wire solder 32 can be urged out opening 50 and into closer proximity to tip 22 (even contacting it) thereby also causing solder 32 to melt. Furthermore, melted solder 32 can collect in notches 28 or behind baffles 26 of tip 22 as desired.

Adjacent end region 48 of conduit 40 is slide 52 which is positioned in tool 10 at a location above the open curvature of half-cone 34 and also above conduit 40. Slide 52 extends through opening 54 in exterior shell 56 of tool 10 and also projects into conduit 40 for repeated engagement with wire solder 32. The upper surface of slide 52 can be grooved as needed or desired so as to facilitate the user moving slide 52 back and forth thereby causing wire solder 32 to move either toward or away from opening 50. Slide 52 can thus be used to send controlled amounts of liquid solder 32 to heated tip 22 or for withdrawing solder 32 from heated tip 22 when sufficient solder 32 has previously been supplied.

During operation, a user would initially activate finger trigger 18 thereby supplying electricity via wires 24 to tip 22. In some cases, tool 10 can draw 25 watts of power, in others, tip 22 can draw 100 watts. If needed, tool 10 can be configured to draw any wattage value desired.

Upon the heating of tip 22, solid wire solder 32 will be urged through conduit 40 via the rotation or otherwise activation of biasing member/wheel 46 and/or slide 52. This wire solder 32 will be guided along its journey by roller pairs 44 forming a part of conduit 40.

Once wire solder 32 reaches end region 48 of conduit 40 adjacent heated tip 22, the solid wire solder 32 will begin to melt after which it can then flow out opening 50. In other cases, the solid wire solder 32 will be urged out opening 50 for closer placement with respect to tip 22. In any event, upon the melting of wire solder 32, the portion not immediately used to secure the workpiece as desired can be collected and stored in recesses 28 for subsequent use. Thus, a supply of solder 32 can be delivered to heated tip 22 for storage/collection in recesses 28. After which, such solder 32 can be selectively re-melted for use on the workpiece thereby enabling the user to operate tool 10 with only one hand (i.e. the hand operating finger trigger 18). The user's other hand can now be used to support the workpiece in place since this other hand is not needed to supply solder to heated tip 22 as normally required (such solder already being collected and stored in recesses 28 of tip 22).

At this stage, tool 10 can be de-activated thereby permitting the previously melted solder 32 to harden within recesses 28. Later, upon the re-heating of tip 22, this now solidified solder 32 can be re-melted and used as desired. Thus, recesses 28 not only serve the function of collecting and holding any overflow of melted solder 32, but recesses 28 also function as a source of supply of solid solder 32 which can be melted as desired merely by activating finger trigger 18.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A soldering tool comprising:

(a) an elongated housing configured to be engaged by the hand of a user;

(b) an elongated conduit secured within said housing and sized to accept and pass a length of solid wire solder therethrough, one end region of said conduit having an opening therein;

(c) guide means within said housing for supporting and guiding said solder along said conduit;

(d) biasing means secured to said conduit for biasing or moving said solder through said conduit and out said opening; and, (e) heated tip means within said housing for heating said one end region of said conduit and for heating said solder therein, said heated tip means comprising solder retaining recesses therein whereby melted solder flowing out of said opening can be collected and stored in said recesses during operation, said solder retaining recesses being defined by one or more pairs of alternating baffles and notches forming a part of said heated tip means.

2. The soldering tool as set forth in claim 1 wherein said heated tip means is configured as a portion of a truncated cone and wherein said one or more said baffle and notch pairs extend generally transverse to the axis of said cone.

3. The apparatus as set forth in claim 1 wherein said one end region of said conduit is tapered and terminates at said opening.

4. The apparatus as set forth in claim 3 wherein said one end region of said conduit is conically shaped.

5. The apparatus as set forth in claim 3 wherein said conduit is continuous within said housing.

6. The apparatus as set forth in claim 3 wherein said guide means comprise roller pairs in engagement with said solder for guiding said solder along said conduit.

7. The apparatus as set forth in claim 6 wherein said biasing means comprise a biasing member for engaging said solder and moving said solder within said conduit.

8. The apparatus as set forth in claim 7 further comprising slide means adjacent said one end region of said conduit for further urging or movement of said solder with respect to said conduit.

9. The apparatus as set forth in claim 8 wherein said slide means comprise a movable slide which selectively engages and disengages said solder for selectively moving said solder through said opening or retracting said solder from said opening.

10. The apparatus as set forth in claim 8 further comprising means for selectively supplying heat to said heated tip means.

11. The apparatus as set forth in claim 10 wherein said means for selectively supplying heat comprise an on/off trigger switch.

12. The apparatus as set forth in claim 10 wherein said soldering tool is gun-shaped.

* * * * *